Nov. 13, 1962   J. BOLSEY   3,063,335
CAMERA MECHANISM WITH INTERMITTENT PULL DOWN SYSTEM
Filed June 17, 1955   4 Sheets-Sheet 1

FIG. I.

INVENTOR.
Jacques Bolsey
BY
Michael S. Striker
agt.

Nov. 13, 1962   J. BOLSEY   3,063,335
CAMERA MECHANISM WITH INTERMITTENT PULL DOWN SYSTEM
Filed June 17, 1955   4 Sheets-Sheet 3

INVENTOR
Jacques Bolsey
BY
Michael S. Striker
agt.

Nov. 13, 1962   J. BOLSEY   3,063,335
CAMERA MECHANISM WITH INTERMITTENT PULL DOWN SYSTEM
Filed June 17, 1955   4 Sheets-Sheet 4

INVENTOR
Jacques Bolsey
BY
Michael S. Striker
agt

United States Patent Office 3,063,335
Patented Nov. 13, 1962

3,063,335
CAMERA MECHANISM WITH INTERMITTENT
PULL DOWN SYSTEM
Jacques Bolsey, New York, N.Y., assignor, by mesne
assignments, to Bolsey Camera Company Inc., Scarsdale, N.Y.
Filed June 17, 1955, Ser. No. 516,271
10 Claims. (Cl. 88—18.4)

The present invention relates to cinematographic cameras.

More particularly, the present invention relates to a claw arrangement for intermittently transporting film in a cinematographic camera, and a transmission for transmitting a drive to the claw as well as the remaining movable parts of the camera.

One of the objects of the present invention is to provide a transmission of the above type which is exceedingly simple and compact as well as very reliable in operation.

Another object of the present invention is to provide a cinematographic camera with a claw arrangement which is also characterized by extreme simplicity and compactness.

An additional object of the present invention is to drive a take-up spool of a magazine in a manner which does not require the use of a slip clutch between the take-up spool and the transmission which drives the same.

Furthermore, it is an object of the present invention to drive the claw with the transmission in one plane while mounting the claw so that it can shift in a direction normal to this one plane.

An additional object of the present invention is to provide structure capable of accomplishing the above objects and made up of simple and ruggedly constructed parts which are easy to assemble and disassemble and which are very reliable in operation.

With the above objects in view, the present invention mainly consists of a cinematographic camera which includes a first wall and a second wall normal to the first wall and fixed to and extending across the same from one side thereof to an opposite side thereof, this second wall being formed with an aperture at the said one side of the first wall. A first gear train is carried by this first wall at the said opposite side thereof for turning movement about a plurality of first axes normal to the first wall, this first gear train terminating in a first bevel gear and being located opposite a portion of the second wall. A second bevel gear meshes with the first bevel gear, and a shaft is connected to the second bevel gear and extends therefrom turnably through the second wall to the side thereof opposite from the first gear train. A second gear train extends along the said portion of the second wall at the said opposite side thereof and is carried thereby for turning movement about a plurality of second axes normal to the second wall, this second gear train including a first gear fixed to the above-mentioned shaft. A plate-like claw is located against the second wall and has a tooth extending into the aperture thereof, this claw being formed in an intermediate portion thereof with a cutout and at an end portion thereof distant from the aperture of the second wall with an opening, a pivot pin being fixed to the second wall and extending with clearance through this opening of the claw. A spring means engages the claw adjacent this pivot pin and urges the claw toward the second wall, and an eccentric is located in the cutout of the claw and is turnably carried by the second wall for engaging the claw to reciprocate the same substantially about the pivot pin so that the claw tooth may advance a film, the spring means and the clearance between the pin and claw enabling the claw tooth to move together with the claw in a direction substantially normal to the second wall. A gear which forms the last gear of the second gear train is coaxial with the turning axis of the eccentric and is connected thereto for turning movement therewith.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 5 is a fragmentary, sectional view showing the claw of the present invention and is taken along the line 5—5 of FIG. 1 in the direction of the arrows;

FIG. 6 is a fragmentary sectional view taken along the line 6—6 of FIG. 5 in the direction of the arrows;

FIG. 7 is a fragmentary sectional view taken along the line 7—7 of FIG. 5 in the direction of the arrows; and FIG. 8 shows diagrammatically the manner in which a take-up spool is wound with the structure of the invention.

Figure 1:
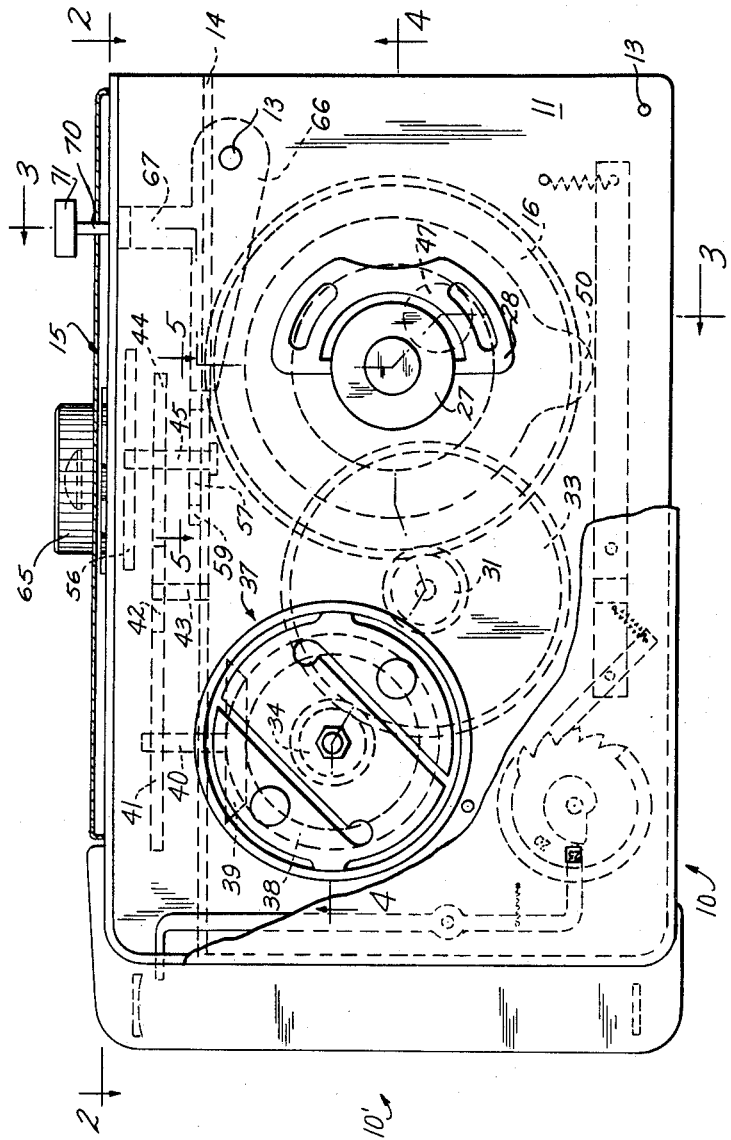
FIG. 1 is a side view of a camera constructed in accordance with the present invention.
Figure 3:
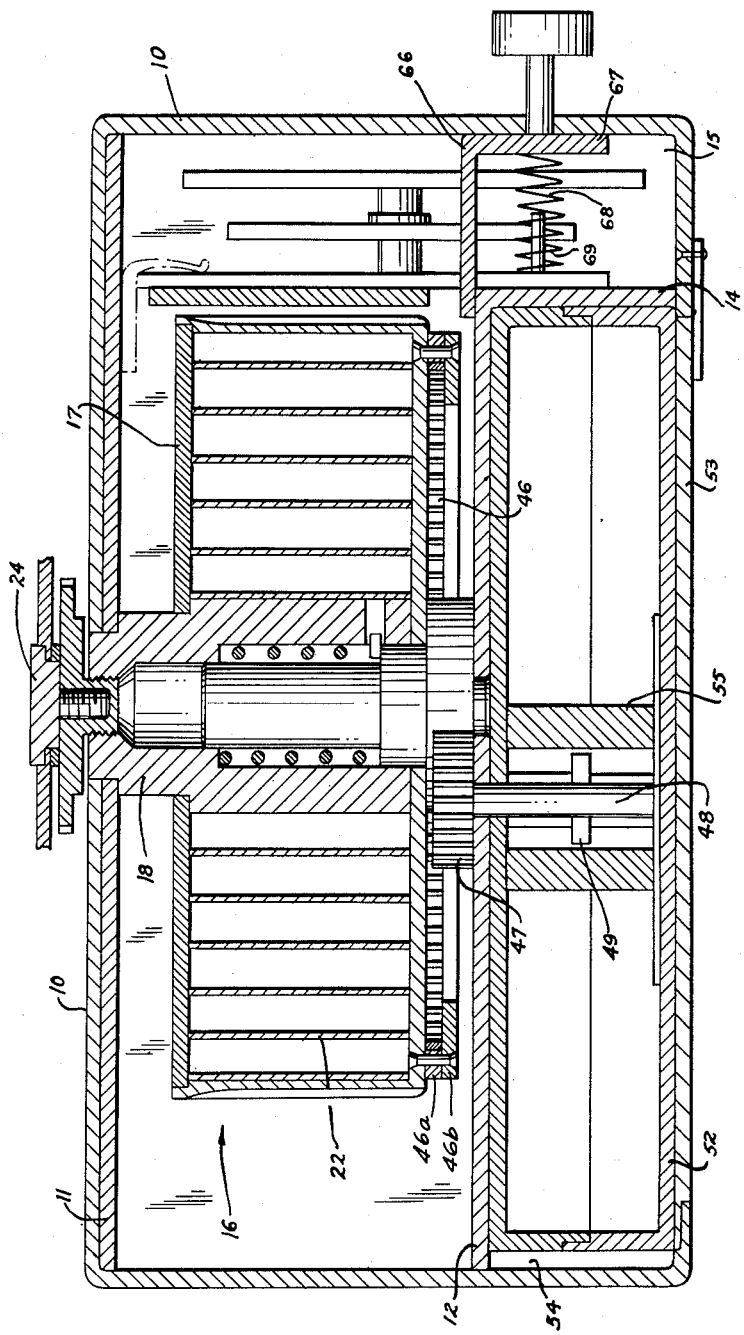
FIG. 3 is a sectional view taken along the line 3—3 of FIG. 1 in the direction of the arrows.
Figure 4:
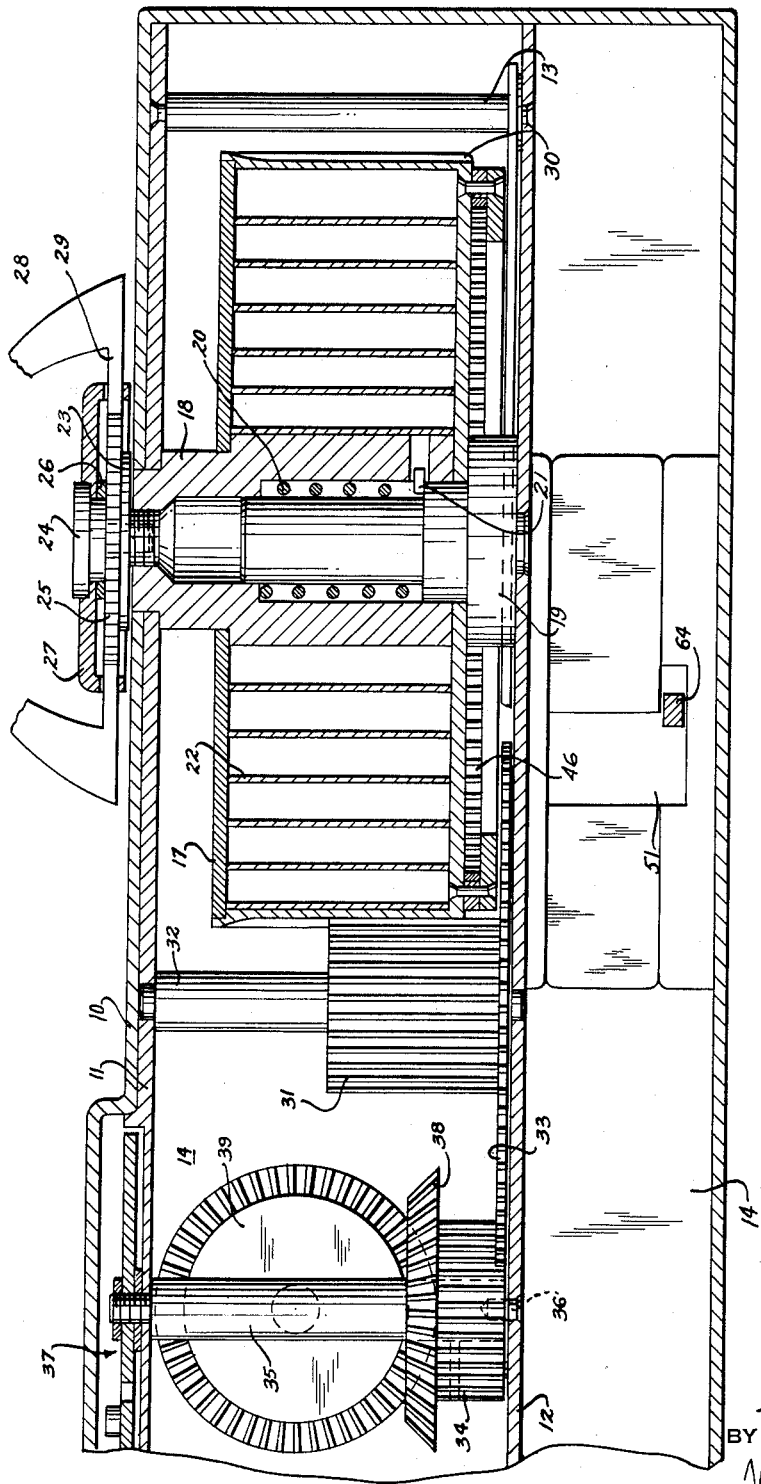
FIG. 4 is a sectional view taken along the line 4—4 of FIG. 1 in the direction of the arrows.

Referring now to the drawings, FIG. 1 shows the general outline of the camera of the invention. The camera includes a casing 10 which houses the remainder of the camera, the casing 10 being provided at its left side, as viewed in FIG. 1, with a view finder assembly 10′ not forming part of the present invention. Within the casing 10 are located walls which support the parts of the camera. Thus, in FIG. 1 the casing 10 is broken away to show the wall 11 normally located within the casing 10. As is shown in FIGS. 3 and 4, a wall 12 is spaced from and parallel to the wall 11, and any suitable elements such as pins 13 interconnect the walls 11 and 12 and maintain them apart from each other and in parallel relation to each other. As is shown in FIG. 3, the wall 12 is fixed at its right edge, as viewed in FIG. 3, to a wall 14 which is normal to and extends across the wall 12. The wall 11 extends across the upper edge of wall 14, as shown in FIG. 3, and the casing 10 forms together with the wall 14 a compartment 15 housing elements which are described below.

A spring motor 16 is located between the walls 11 and 12 and includes a barrel 17 turnable on a pin 18 which extends at its top end portion, as viewed in FIGS. 3 and 4, through aligned openings of the wall 11 and the casing 10. The bottom wall of the barrel 17 is turnable about a pin 19 which is fixed to the wall 12 and which extends into the hollow pin 18 to support the latter for rotation. As is evident from FIGS. 3 and 4, the pins 18 and 19 form in the interior of pin 18 a chamber 20, and in this chamber is located a spring 21 coiled about the upper portion of pin 19, as viewed in FIG. 4, and having a free end extending into a bore formed in the pin 18. This spring 21 is a "no-back" spring permitting pin 18 to turn in one direction with respect to pin 19 but preventing pin 18 from turning in an opposite direction with respect to pin 19, this "no-back" spring being a well known equivalent of a pawl and ratchet, for example. Thus, the pin 18 may be turned in one direction with respect to pin 19 to tension the spiral spring 22 located within the barrel 17 and fixed at its opposite ends to the barrel 17 and to the pin 18, respectively, and the "no-back" spring 21 enables the tension of spring 22 to be retained so that the spring 22 will urge the barrel 17 about the pin 18. A bored member 23 extends threadedly into the top end portion of pin 18, as viewed in FIG. 4, and is itself provided with a threaded bore into which the threaded shank of a bolt 24 extends, a ratchet wheel 25 being clamped to the member 23 between the latter and the bolt 24 by turning of the bolt 24 into the member 23. The enlarged head of the bolt 24 and a washer 26 located about the same on the ratchet wheel 25 turnably support a dished member 27 which turnably carries a handle 28 having a pair of extensions 29 extending turnably through openings of the dished member 27, so that this handle 28 is turnable from the operative position indicated in FIG. 4 to an inoperative position located alongside of the casing 10. The extensions 29 have springy ends respectively engaging the ratchet wheel 25 so that when the handle 28 is turned in one direction the pin 18 will turn together with the handle 28 to tension the spring 22 while when the handle 28 is turned in the opposite direction the springy free ends of the extensions 29 will simply ride over the teeth of the ratchet wheel 25.

The outer cylindrical surface of barrel 17 is formed with gear teeth 30 so that the barrel 17 operates simultaneously as the first gear of a gear train for transmitting power from the spring motor 16 to elements of the camera. The teeth 30 mesh with a pinion 31 turnably carried by a shaft 32 fixed to and extending between the walls 11 and 12, and a gear 33 is fixed to the pinion 31 for turning movement therewith and is coaxial therewith. The gear 33 in its turn meshes with a pinion 34 which is fixed to and carried by a shaft 35 which is coaxial with the pinion 34. The shaft 35 extends through the pinion 34 and is formed at its bottom end, as viewed in FIG. 4, with a bore into which a pin 36 fixed to the wall 12 extends to turnably support the shaft 35. The top end portion of shaft 35 is of a reduced diameter and extends turnably through an opening in the wall 11 to support within a recess of this wall a governor mechanism 37 of any suitable construction not forming part of the present invention and controlling the speed with which the camer parts are driven by the spring motor 16. Thus, the pinion 34 and shaft 35 turn together, and a bevel gear 38 which is coaxial with and fixed to the pinion 34 necessarily turns therewith.

The barrel 17 plus elements 31, 33, 34 and 38 form gears of a first gear train which extends along and is located opposite an intermediate portion of the wall 14 located at the upper side of wall 12, as is evident from FIG. 4. All of these gears of this gear train are turnable about axes which are normal to the wall 12 and parallel to the wall 14.

A bevel gear 39 meshes with the bevel gear 38 and is fixed to a shaft 40 (FIG. 2) which extends turnably through the wall 14, which is turnably supported by the latter, and which is normal to the shaft 35. At the side of wall 14 opposite from bevel gear 39 a gear 41 is fixed to the shaft 40 for turning movement therewith, and this gear 41 in turn meshes with an idler gear 42 turnably carried on a pin 43 fixed to the wall 14. The idler gear 42 meshes with a gear 44 which is fixed to a shaft 45 turnably carried for rotation about its axis by the wall 14. Thus, it will be seen that the gears 41, 42, 44 form a second gear train extending along that portion of the wall 14 which is located opposite the first gear train described above. It will be noted that the gears 41, 42 and 44 are respectively turnable about axes which are normal to the wall 14, and furthermore it will be seen that the transmission proceeds in one direction from the spring motor up to the bevel gear 38 and then proceeds in the opposite direction back along the opposite side of the wall 14. This arrangement of two gear trains, one of which drives the other, provides an exceedingly compact transmission which requires an extremely small space and at the same time may be conveniently connected to all of the camera elements which must be driven.

As was pointed out above the shaft 35 supports and is operatively connected to the governor 37 for controlling the speed of operation. The barrel 17 carries at its underside an internal annular gear 46 which meshes with a gear 47 (FIG. 3). This gear 47 is fixed to a shaft 48 turnably carried by the wall 12 and having a pin 49 traversing the same for a purpose described below. The annular gear 46 is formed with a camming projection 50 which cooperates with the structure shown along the lower portion of FIG. 1 for actuating a counter and a spring tension indicator. These latter features form no part of the present invention so that in the interest of conciseness these features are not described.

The last gear 44 of the gear train within the chamber 15 serves to deliver the energy of the spring motor to the shutter and claw actuating mechanism of the camera. It will be noted that the wall 14 is formed at the side of wall 12 opposite from the above-described gear train with an aperture 51 through which the light rays pass to film carried by a magazine 52 (FIG. 3). As is evident from FIG. 3 the casing 10 is provided with a removable cover portion 53 for covering a chamber 54 defined by the walls 12 and 14 and the casing 10 as indicated in FIG. 3. The magazine 53 is located within this chamber 54 and the film of the magazine is moved by the claw past the aperture 51 in a manner described below. As is evident from FIG. 3 the pin 49 extends into opposed elongated parallel grooves of a turnable core member 55 of a take-up spool in the magazine, and thus it will be seen that the annular gear 46 and pinion 47 serves to drive the take-up spool 55 as described below.

Figure 2:
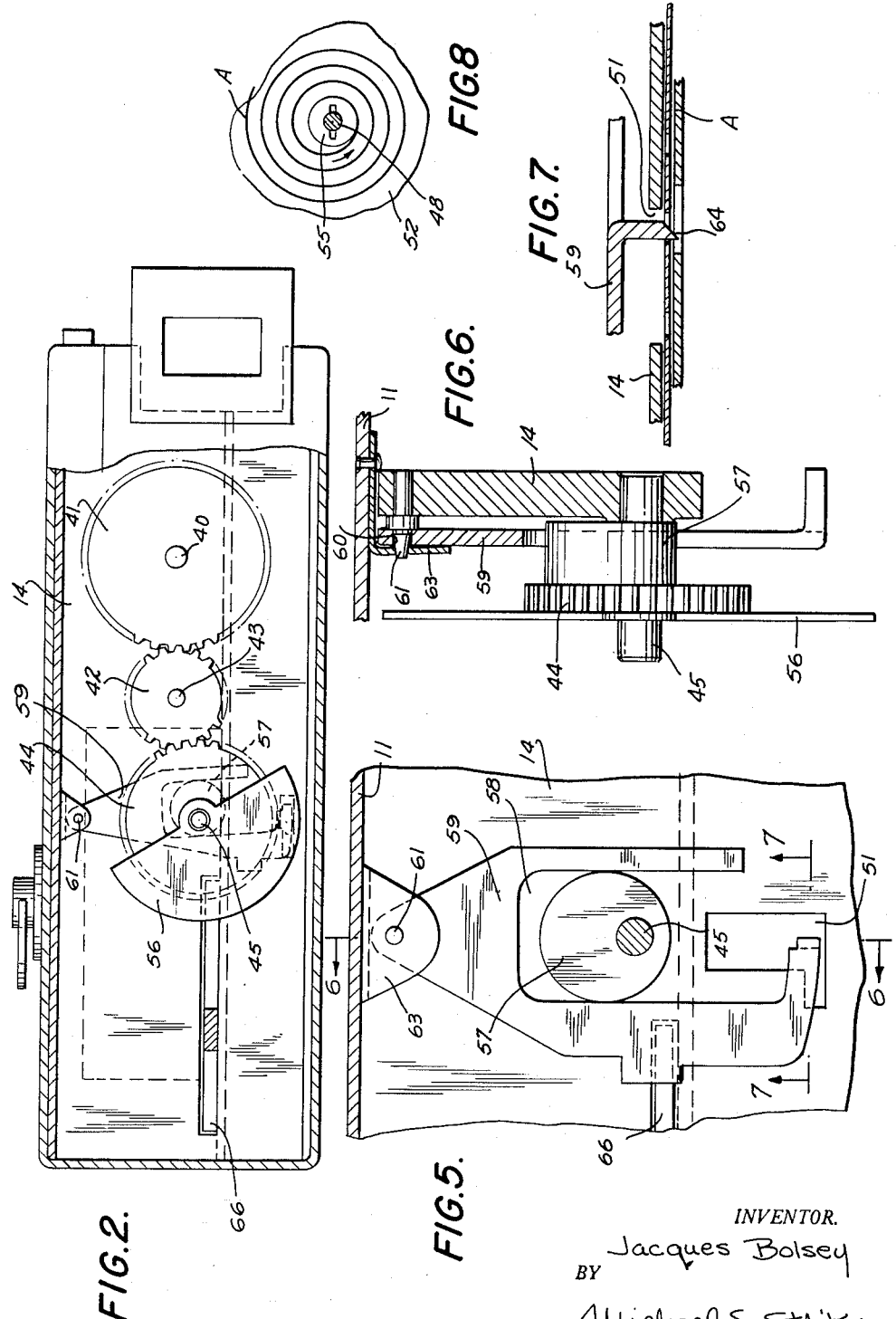
FIG. 2 is a sectional view taken along the line 2—2 of FIG. 1 in the direction of the arrows.

As is shown in FIG. 2, a substantially semicircular shutter 56 is fixed to the shaft 45 for turning movement therewith. Furthermore, at the side of gear 44 opposite from the shutter 56 an eccentric 57 is located, and this eccentric is positioned next to the wall 14.

The eccentric 57 which turns together with the shaft 45 is located within a cutout 58 (FIG. 5) of a substantially C-shaped claw 59 which is made from a thin platelike metal and which is formed at one end with an opening 60 through which a pivot pin 61 extends with appreciable clearance, this pivot pin 61 being fixed to and carried by the wall 14. At its edge which engages the wall 11, the wall 14 is formed with a cutout 62 through which a leaf spring 63 fixed to the wall 11 extends, this leaf spring 63 being formed with an aperture through which the pivot pin 61 freely extends. As is shown most clearly in FIGS. 5 and 6, the leaf spring 63 bears against the claw 59 to urge the latter against the wall 14, and at the same time it will be noted that the claw 59 is movable against the force of spring 63 away from the wall 14. The right end of the claw 59, as viewed in FIG. 5, overlaps the aperture 51 and is fixed to a claw tooth 64 which may be integral with the remainder of the claw 59 and which extends through the aperture 51 of the wall 14, as shown most clearly in FIG. 7, so that when the claw 59 is reciprocated by the eccentric 57, the tooth 64 will engage and move the film A during movement of this tooth to the left, as viewed in FIG. 7, while when this tooth 64 moves to the right, as viewed in FIG. 7, it will simply ride over the film A, and will be capable of moving upwardly as viewed in FIG. 7 because of the clearance between the pivot pin 61 and the claw 59, the spring 63 urging the claw 59 back down to the wall 14. Thus, it will be seen that with this claw mechanism the energy of the motor 16 reciprocates the tooth 64 to enable this tooth 64 to shift the film by a distance equivalent to one frame while this tooth 64 moves to the left, as viewed in FIG. 7.

The objective 65 is carried by the casing 10 in alignment with the aperture 51. In order to stop and start the camera a lever 66 is turnable about the upper right pin 13, as viewed in FIG. 1. As is evident from FIGS. 2 and 3, this lever 66 extends through an elongated cutout of the wall 14 and rests on the wall 12 beneath the spring motor 16. The left end of the lever 66, as viewed in FIG. 1, and its right end, as viewed in FIG. 2, is located in the path of movement of the claw 59 when the lever 66 is in the position indicated in FIG. 1. This lever 66 is provided with an L-shaped extension 67 which is urged against the right wall of casing 10, as viewed in FIG. 3, by a spring 68 supported on a pin 69 fixed to the wall 14 abutting against the wall 14 and the extension 67. In this position the spring motor simply moves the claw against the free end of the lever 66 and the camera cannot operate. A pin 70 extends through an opening in the casing 10, has an enlarged outer end 71 and is fixed to the extension 67. Thus, when the operator pushes pin 70 by pressing against the enlarged end 71 thereof inwardly to the chamber 15 against the influence of spring 68, the lever 66 will turn in a counter-clockwise direction, as viewed in FIG. 1, and the free end of this lever will move out of the path of movement of the claw to free the latter to the spring motor, and in this way the operation of the camera is started. In order to stop the camera the operator merely releases the button 71 and the spring 68 returns the lever 66 to the position where it blocks movement of the claw 59 in order to stop the operation of the camera.

A particular feature of the present invention resides in the fact that the transmission described above and shown in the drawings is capable of winding the exposed film onto the take-up spool in a manner which does not require a slip clutch. It should be noted that in FIG. 3 a ring 46a is shown located above the annular gear 46, and this ring 46a is slightly less thick than the gear 46. An annular leaf spring 46b is held against the ring 46a and is connected with the latter to the housing of the spring motor by rivets or the like. Thus, with the arrangement shown in FIG. 3 the ring gear 46 is maintained in driving engagement with the spring motor by the pressure of the annular sprint 46b. However this slip clutch arrangement, which enables the ring gear 46 to slip, is only a safety device to protect the parts in the event that the gears should jam for any reason. This slip clutch which is shown in FIG. 3 does not operate during winding of film onto the core 55 of the take-up spool.

FIG. 8 diagrammatically shows the manner in which the cake of the take-up spool is formed. It will be noted from FIG. 8 that the convolutions of exposed film A are loose. Thus, a slip clutch is not required in the transmission to the core 55. The arrangement according to the present invention is such that the convolutions of the take-up spool become closed against each other only at the instant when the winding of exposed film onto the take-up spool ends, so that there is never a moment before the cake is fully wound when the convolutions are tightly drawn. As a result of this feature much less energy is required to operate the camera of the invention and the water on the parts is greatly reduced.

The result of winding exposed film onto the take-up spool in the above-described manner is brought about by the above described transmission which rotates the take-up spool core 55 at a speed which has a very special relationship to the speed with which the film is transported by the claw. It is easier to understand this speed relationship if the step by step transportation of the film by the claw is considered in terms of linear speed. In other words although the claw periodically transports the film in a step-by-step fashion, so as to move a given number of film frames per second, this step-by-step movement obviously is the equivalent of a certain linear speed of the film. If one now considers the winding of a conventional film cake onto a take-up spool, it is apparent that while the core of the take-up spool rotates at a constant angular speed the periphery of the take-up spool, which is continually increasing in diameter during winding of film thereon, moves at a continuously increasing linear speed. This linear speed at the periphery of a conventional take-up spool, during winding thereof, is at a minimum when the winding is started and at a maximum when the winding is completed, because the take-up spool is driven at a constant angular speed and its diameter is continuously increasing. When such a conventional take-up spool is half completed its peripheral speed is an average linear speed midway between the maximum and minimum linears speeds at the periphery of the take-up spool, and in accordance with the present invention the claw is operated at a speed which transports the film in a step-by-step fashion but at a rate which is the equivalent of a linear speed of film movement equal to this the average linear speed, which is to say the linear speed which would obtain at the periphery of a conventional take-up spool when it is half completed. Thus, it will be seen that the transmission of the present invention operates the claw and rotates the take-up spool core at speeds which have a very special relationship to each other, and it is this relationship which produces the above-described result of eliminating the necessity for a slip clutch and of tightening the convolutions of the take-up spool cake upon each other only at the instant when the winding of take-up spool is completed.

The specific manner in which the above-described features operate is believed to be evident. Thus, during the first half of the winding of the exposed film onto the take-up spool the claw will transport the film to the take-up spool at the equivalent of a linear speed which is greater than that required to wind closed convolutions on to the take-up spool, and thus during the first half of the winding very loose convolutions will be provided. However during the second half of the winding of the exposed film onto the take-up spool the linear speed at which the claw delivers exposed film to the take-up spool will be to an increasing extent less than that required for delivering closed convolutions at this stage of the winding, and as a result the loose convolutions continuously approaching each other until at the very end a closed cake is provided.

It is believed to be evident from the above description that the disclosed structure includes a compact and relatively simple gear train capable of transmitting the energy of the spring motor to all parts of the camera, and furthermore an exceedingly simple claw arrangement is provided to be driven by the spring motor.

It will be understood that each of the elements described above, or two or more together, may also find a useful application in other types of cinematographic cameras differing from the types described above.

While the invention has been illustrated and described as embodied in claw and gear train of a cinematographic camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essenial characteristics of the generic or specific aspects of this invention and, therefore, such adaptations should and are intended to be comprehended within the meaning and range of equivalence of the following claims.

What is claimed as new and desired to be secured by Letters Patent is:

1. In a cinematographic camera, in combination, a pair of spaced parallel walls and a third wall extending across the space between said parallel walls perpendicularly thereto and having beyond said parallel walls a portion formed with an opening; a pair of gear train units each composed of a plurality of meshing gears respectively having parallel axes of rotation, the axes of rotation of one unit extending perpendicularly with respect to the axes of rotation of the other unit said one unit being located between and carried by said pair of walls and said other unit being carried by said third wall outside of the space between said parallel walls; drive means between said pair of parallel walls operatively connected to the first gear of said one unit for driving the same; motion transmitting means extending between said units for transmitting motion from the last gear of said one unit to the first gear of said other unit; and claw means operatively connected to the last gear of said other unit to be driven thereby, the transmission provided by said units starting at said drive means and extending in one direction along said one unit to said motion transmitting means and then returning in a direction opposite to said one direction along said other unit to said claw means, so that said units are located alongside each other and provide a compact assembly, said claw means including a tooth extending into said opening of said third wall.

2. In a cinematographic camera, in combination, a first wall; a second wall engaging and normal to said first wall; a first gear train unit carried by said first wall for turning movement about a plurality of first axes normal to said first wall, said first gear train unit terminating in a first bevel gear and being located opposite a portion of said second wall; a spring motor carried by said first wall and including a turnable barrel having gear teeth at its outer surface and forming the first gear of said first gear train unit; a second bevel gear meshing with said first bevel gear; a shaft connected to said second bevel gear and extending therefrom turnably through said second wall to the side thereof opposite from said first gear train unit; a second gear train extending along said portion of said second wall at said opposite side thereof and carried thereby for turning movement about a plurality of second axes normal to said second wall, said second gear train unit including a first gear fixed to said shaft; and claw means carried by said second wall and operatively connected to the last gear of said second gear train unit to be driven thereby, the transmission provided by said first and second units starting at said first gear of said first unit and extending in one direction along said first unit to said first and second bevel gears and then returning in a direction opposite to said one direction along said second unit to said claw means, so that said units are located alongside each other and provide a compact assembly.

3. In a cinematographic camera, in combination, a plate; a rigid claw located next to said plate and having a rigid tooth, said claw being formed at an intermediate portion thereof with a cutout and at an end portion thereof with an opening; a pivot pin fixed to said plate and extending with clearance through said opening; spring means engaging said claw adjacent said pin and urging said claw substantially axially of said pivot pin toward said plate; and eccentric means turnably carried by said plate and located in said cutout of said claw for engaging the latter at an edge of said cutout to reciprocate the claw substantially about said pivot pin so that said tooth may advance a film when said claw moves in one direction, said spring means and the clearance between said pin and claw enabling said tooth, when said claw moves in the opposite direction, to be raised by the film and move together with said claw in a direction substantially normal to said plate.

4. In a cinematographic camera, in combination, support means including a plate formed with an aperture; a plate-like rigid claw located against said plate and having a rigid tooth extending into said aperture, said claw being formed at an intermediate portion thereof with a cutout and at an end portion thereof distant from said aperture with an opening; a pivot pin fixed to said plate and extending with clearance through said opening; spring means engaging said claw adjacent said pin and urging said claw substantially axially of said pivot pin toward said plate; an eccentric located in said cutout of said claw and turnably carried by said plate for engaging an edge of said cutout of said claw to reciprocate the same substantially about said pivot pin so that said tooth may advance a film, said spring means and the clearance between said pin and claw enabling said tooth to be raised by the film and moved together with said claw in a direction substantially normal to said plate; a gear coaxial with the turning axis of said eccentric and connected thereto for turning movement therewith; and gear means meshing with said gear for rotating the latter to rotate said eccentric and reciprocate said claw.

5. In a cinematographic camera, in combination, a first wall; a second wall normal to said first wall and fixed to and extending across the same from one side thereof to an opposite side thereof, said second wall being formed with an aperture on said one side of said first wall; a first gear train carried by said first wall at said opposite side thereof for turning movement about a plurality of first axes normal to said first wall, said first gear train terminating in a first bevel gear and being located opposite a portion of said second wall; a second bevel gear meshing with said first bevel gear; a shaft connected to said second bevel gear and extending therefrom turnably through said second wall to the side thereof opposite from said first gear train; a second gear train extending along said portion of said second wall at said opposite side thereof and carried thereby for turning movement about a plurality of second axes normal to said second wall, said second gear train including a first gear fixed to said shaft; a plate-like claw located against said second wall and having a tooth extending into said aperture, said claw being formed at an intermediate portion thereof with a cutout and at an end portion thereof distant from said aperture with an opening; a pivot pin fixed to said second wall and extending with clearance through said opening; spring means engaging said claw adjacent said pin and urging said claw toward said second wall; an eccentric located in said cutout of said claw and turnably carried by said second wall for engaging said claw to reciprocate the same substantially about said pivot pin so that said tooth may advance a film, said spring means and the clearance between said pin and claw enabling said tooth to move together with said claw in a direction substantially normal to said second wall; and a gear forming the last gear of said second gear train and being coaxial with the turning axis of said eccentric and connected thereto for turning movement therewith.

6. In a cinematographic camera, in combination, support means including a plate formed with an aperture; a plate-like rigid claw located against said plate and having a rigid tooth extending into said aperture, said claw being formed at an intermediate portion thereof with a cutout and at an end portion thereof distant from said aperture with an opening; a pivot pin fixed to said plate and extending with clearance through said opening; spring means engaging said claw adjacent said pin and urging said claw toward said plate; a shaft turnably carried by said plate and extending through said cutout of said claw; an eccentric fixed to said shaft for turning movement therewith, located in said cutout of said claw and turnably carried by said plate for engaging an edge of said cutout of said claw to reciprocate the same substantially about said pivot pin so that said tooth may advance a film, said spring means and the clearance between said pin and claw enabling said tooth to move together with said claw in a direction substantially normal to said plate; a gear fixed to said shaft; gear means meshing with said gear for rotating the latter to rotate said eccentric and reciprocate said claw; and a shutter fixed to said shaft for turning movement therewith along a path extending over said aperture.

7. In a cinematographic camera, in combination, support means including a plate formed with an aperture;

a plate-like rigid claw located against said plate and having a rigid tooth extending into said aperture, said claw being formed at an intermediate portion thereof with a cutout and at an end portion thereof distant from said aperture with an opening; a pivot pin fixed to said plate and extending with clearance through said opening; spring means engaging said claw adjacent said pin and urging said claw toward said plate; a shaft turnably carried by said plate and extending through said cutout of said claw; an eccentric fixed to said shaft for turning movement therewith, located in said cutout of said claw and turnably carried by said plate for engaging an edge of said cutout of said claw to reciprocate the same substantially about said pivot pin so that said tooth may advance a film, said spring means and the clearance between said pin and claw enabling said tooth to move together with said claw in a direction substantially normal to said plate; a gear fixed to said shaft; gear means meshing with said gear for rotating the latter to rotate said eccentric and reciprocate said claw; and a shutter fixed to said shaft for turning movement therewith along a path extending over said aperture, said shutter being located at the side of said gear opposite from said eccentric.

8. In a cinematographic camera as recited in claim 1, governor means operatively connected to said motion transmitting means to be driven thereby for limiting the speed of rotation of the gears of said units, said governor means being located outside the space between said parallel walls adjacent one of the latter walls so as to be accessible outside of the space between said parallel walls.

9. In a camera as recited in claim 2, a rotary shutter also connected to the last gear of said second gear train unit to be driven thereby.

10. In a camera as recited in claim 2, said first gear train unit including between said first gear thereof and said first bevel gear a pinion meshing with said first gear of said first gear train unit, a second gear of said first gear train unit fixed coaxially to said pinion for rotary movement therewith, and a third gear of said first gear train unit meshing with said second gear and fixed coaxially to said first bevel gear, so that between said first gear of said first gear train unit and said first bevel gear there are only three gears two of which, namely said pinion and said second gear of said first gear train unit, are coaxial with each other while said third gear of said first gear train unit is coaxial with said first bevel gear, and said second gear train unit including only three gears made up of said first gear of said second gear train unit which is fixed to said shaft, the last gear of said second gear train unit which is operatively connected to said claw means, and only a single intermediate gear located between and meshing with said first and last gears of said second gear train unit, whereby only three gears make up said second gear train unit so that the entire transmission includes only seven gears in addition to said first and second bevel gears.

References Cited in the file of this patent

UNITED STATES PATENTS

| | | |
|---|---|---|
| 1,217,598 | Heinze | Feb. 27, 1917 |
| 1,262,284 | Teague | Apr. 9, 1918 |
| 1,275,636 | Wenderhold | Aug. 13, 1918 |
| 1,749,779 | Proksa | Mar. 11, 1930 |
| 2,017,117 | Briggs | Oct. 15, 1935 |
| 2,159,574 | Tschortener | May 23, 1939 |
| 2,168,043 | O'Grady | Aug. 1, 1939 |
| 2,220,599 | Galter | Nov. 5, 1940 |
| 2,280,737 | Alburger | Apr. 21, 1942 |
| 2,468,993 | Moomaw | May 3, 1949 |
| 2,641,962 | Jungjohann | June 16, 1953 |
| 2,719,455 | Mitchell | Oct. 4, 1955 |
| 2,725,120 | Brown | Nov. 29, 1955 |
| 2,757,569 | Isom | Aug. 7, 1956 |
| 2,819,647 | Golick et al. | Jan. 14, 1958 |
| 2,893,287 | Lunzer | July 7, 1959 |

FOREIGN PATENTS

| | | |
|---|---|---|
| 14,275 | Great Britain | June 13, 1914 |
| 495,286 | Great Britain | Nov. 10, 1938 |